United States Patent
Lee et al.

(10) Patent No.: US 11,482,169 B2
(45) Date of Patent: Oct. 25, 2022

(54) ORGANIC LIGHT EMITTING DIODE DISPLAY THERMAL MANAGEMENT

(71) Applicant: Dell Products L.P., Round Rock, TX (US)

(72) Inventors: Jong Seo Lee, Austin, TX (US); Deeder M. Aurongzeb, Austin, TX (US); Asim M. Siddiqui, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/240,633

(22) Filed: Apr. 26, 2021

(65) Prior Publication Data

US 2021/0241690 A1 Aug. 5, 2021

Related U.S. Application Data

(62) Division of application No. 16/662,905, filed on Oct. 24, 2019, now Pat. No. 11,011,110.

(51) Int. Cl.
*G09G 3/3233* (2016.01)
*G06F 1/16* (2006.01)

(52) U.S. Cl.
CPC ......... *G09G 3/3233* (2013.01); *G06F 1/1618* (2013.01); *G09G 2320/041* (2013.01); *G09G 2320/0626* (2013.01)

(58) Field of Classification Search
CPC ... G09G 2320/0626; G09G 2320/0233; G09G 2340/0407
See application file for complete search history.

(56) References Cited

U.S. PATENT DOCUMENTS

| | | |
|---|---|---|
| 6,618,314 B1 | 9/2003 | Fiscus et al. |
| 8,552,636 B2 | 10/2013 | Chaji |
| 10,817,082 B1 | 10/2020 | Yildiz et al. |
| 2005/0248517 A1* | 11/2005 | Luther Weindorf ......... G09G 3/3208 345/82 |
| 2005/0285518 A1 | 12/2005 | Cok |
| 2006/0101293 A1* | 5/2006 | Chandley ............. G06F 1/3203 713/300 |
| 2006/0160255 A1* | 7/2006 | Chang ................. G09G 3/3258 438/22 |
| 2008/0111833 A1 | 5/2008 | Thorn |
| 2008/0212305 A1 | 9/2008 | Kawana et al. |
| 2008/0224948 A1 | 9/2008 | Alberth |
| 2008/0225033 A1 | 9/2008 | Hector |

(Continued)

FOREIGN PATENT DOCUMENTS

WO 2014174472 A1 10/2014

*Primary Examiner* — Van N Chow
(74) *Attorney, Agent, or Firm* — Zagorin Cave LLP; Robert W. Holland (57) ABSTRACT

An information handling system organic light emitting diode (OLED) display adapts presentation of visual information to manage a display thermal state, such as to maintain a uniform thermal condition. In one example embodiment, a first display zone of plural pixels presents visual images with a first refresh rate, such as the nominal refresh rate established by the display settings, and a second display zone presents visual images with a partial pixel refresh rate that reduces power dissipation and, thus, thermal energy release so that a more uniform thermal state may be achieved at the display.

7 Claims, 6 Drawing Sheets

(56) References Cited

U.S. PATENT DOCUMENTS

| | | |
|---|---|---|
| 2010/0033087 A1 | 2/2010 | Kim et al. |
| 2012/0092397 A1 | 4/2012 | DeLuca |
| 2012/0236040 A1 | 9/2012 | Eom et al. |
| 2013/0235023 A1 | 9/2013 | Chaji |
| 2013/0328755 A1 | 12/2013 | Al-Dahle et al. |
| 2013/0328759 A1 | 12/2013 | Al-Dahle et al. |
| 2013/0328843 A1 | 12/2013 | Al-Dahle et al. |
| 2013/0329057 A1 | 12/2013 | Al-Dahle et al. |
| 2014/0097440 A1 | 4/2014 | Jeon |
| 2015/0205946 A1 | 7/2015 | Aurongzeb et al. |
| 2015/0348493 A1 | 12/2015 | Chae et al. |
| 2017/0124943 A1 | 5/2017 | Peana |
| 2017/0178565 A1* | 6/2017 | Fujimaki ............... G09G 3/003 |
| 2018/0040680 A1 | 2/2018 | Cai |
| 2018/0210508 A1 | 7/2018 | Aurongzeb et al. |
| 2018/0210514 A1 | 7/2018 | Wang |
| 2018/0210515 A1 | 7/2018 | Lyles et al. |
| 2019/0014300 A1* | 1/2019 | Henry ..................... H04N 9/646 |
| 2019/0035319 A1 | 1/2019 | Kapinos et al. |
| 2019/0096328 A1* | 3/2019 | Chen ..................... G09G 3/3258 |
| 2019/0163343 A1 | 5/2019 | Ligameri et al. |
| 2019/0243424 A1 | 8/2019 | Lee et al. |
| 2019/0244564 A1 | 8/2019 | Peana |
| 2020/0034100 A1 | 1/2020 | Fan et al. |
| 2021/0125551 A1* | 4/2021 | Siddiqui ............... G06F 1/3212 |
| 2021/0385533 A1* | 12/2021 | Daly ..................... H04N 21/84 |

* cited by examiner

ORGANIC LIGHT EMITTING DIODE DISPLAY THERMAL MANAGEMENT

CROSS REFERENCE TO RELATED APPLICATIONS

This application is a divisional of U.S. patent application Ser. No. 16/662,905, filed Oct. 24, 2019, entitled "Organic Light Emitting Diode Display Thermal Management," naming Jong Seo Lee, Deeder M. Aurongzeb, and Asim M. Siddiqui as inventors, which application is incorporated herein by reference in its entirety.

U.S. patent application Ser. No. 16/662,888, entitled "Organic Light Emitting Diode Display Power Management Based on Usage Scaling" by inventors Asim M. Siddiqui, Deeder M. Aurongzeb, and Jong Seo Lee, filed Oct. 24, 2019, describes exemplary methods and systems and is incorporated by reference in its entirety.

U.S. patent application Ser. No. 16/662,897, entitled "Organic Light Emitting Diode Display Compensation Tool" by inventors Jong Seo Lee, Deeder M. Aurongzeb, and Asim M. Siddiqui, filed on Oct. 24, 2019, describes exemplary methods and systems and is incorporated by reference in its entirety.

BACKGROUND OF THE INVENTION

Field of the Invention

The present invention relates in general to the field of portable information handling systems, and more particularly to an information handling system organic light emitting diode display thermal management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that rotationally couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. In a tablet configuration, the housing portions rotate 360 degrees relative to each other to expose the display for touch inputs while the keyboard is hidden at the bottom of the system. After usage, convertible information handling systems rotate the lid housing portion over the main housing portion to protect the keyboard and display, thus reducing the system footprint for improved storage and mobility.

Recently, portable information handling systems have begun transitioning from integrating liquid crystal displays (LCDs) to instead integrate organic light emitting diode (OLED) displays. LCDs generate visual images by passing illumination from a backlight through an array of pixels that filter red, green and blue light. In contrast, OLED displays generate visual images by creating illumination with direct current applied to red, green and blue OLED material of each pixel. One advantage of OLED displays is that generating visual images without a backlight tends to decrease the thickness of the display panel. Another advantage of OLED displays is that the display material integrates in a flexible film that can fold over housing structures. One example system has an OLED display film folded over a housing portion so that a display surface presents visual images at opposing sides of the housing portion. Another way that an OLED foldable display film integrates in an information handling system is to fold at a hinge location so that the display can present a flat tablet appearance with a relatively large surface area or can fold in a clamshell position to hold part of the display in a raised viewing position.

Although OLED display films offer increased flexibility for integration of a display in a portable information handling system, OLED display operations tend to introduce thermal and power management challenges. Generally, OLED material creates greater illumination by increasing current applied to the OLED material. Applying different amounts of current to red, green and blue OLED material of a pixel generates a unique color and luminance with varied brightness of red, green and blue light resulting from each OLED material. The different currents are scanned across OLED pixels at a refresh rate applied by a timing controller (TCON) of the display. The TCON sets the current levels based upon pixel values defined by a graphics controller, which creates the pixel values to define a visual image across the array of OLED pixels. However, OLED material tends to degrade over time so that, as the OLED pixels are used, different levels of current are needed to create a desired illumination. To achieve a desired presentation of visual images at an OLED display, a compensation table is typically maintained that adjusts the amount of current applied at each pixel for the degradation at each pixel. Degradation of OLED material in each pixel is estimated based upon the type of visual images presented by each pixel over time, such as the color and luminance at each pixel. As a result of variations in current applied to pixels to obtain desired illumination at each pixel, irregularities in thermal distribution and power consumption can result. In addition, degradation of OLED material can result in ghosting of visual images at the display where compensation estimated over time does not match the actual impact of OLED material degradation on visual image creation.

Integration of OLED display films into a convertible information handling system introduces additional challenges, especially where the OLED display film is disposed on opposing faces of the housing. For instance, the angle at which an end user views the display may vary based upon the rotational orientation of the rotationally coupled portable housing portions. In some rotational orientations, some parts of the display surface may have more prominent end user interactions than other parts. Further, as the portable housing moves to varying lighting conditions, such as with different ambient light characteristics, display color and luminance may have to change to maintain a consistent appearance of presented visual images for the end user. As display pixels respond to varying conditions, thermal and power management difficulties tend to arise, especially where display pixel compensation is less accurate. In addition, image ghosting may become more distinct and variable since thermal and power variations impact illumination from OLED material in a variable manner as the OLED material degrades.

SUMMARY OF THE INVENTION

Therefore, a need has arisen for a system and method which manages power and thermal conditions at an organic light emitting diode (OLED) display.

A further need exists for a system and method that adapts compensation at an OLED display over time with measurements of degradation at the OLED material.

In accordance with the present invention, a system and method are provided which substantially reduce the disadvantages and problems associated with previous methods and systems for management of OLED display power, thermal and degradation constraints. An OLED display is divided into plural zones of plural pixels to present visual images in each zone with adjustments to color and brightness that achieve desired power, thermal and degradation constraints. Based upon various predetermined conditions, pixels in different display zones may present visual images with full or partial pixel density, base commanded or reduced brightness, base commanded scan rate or reduced scan rate, or other display zone individualized presentation parameters.

More specifically, an information handling system processes information with a processor that executes instructions in cooperation with a memory that stores the information and instructions. A graphical processing unit further processes the information to define visual images with pixel values that command the color and luminance generated by application of current to OLED material of each pixel. A display zone manager executing on the information handling system, such as with embedded code stored in non-transitory memory to execute on an embedded controller or graphics processor, defines plural display zones of plural contiguous OLED pixels at the display based upon one or more predetermined conditions, such as power constraints, thermal constraints and/or OLED material preservation. Based upon the detected condition, pixels of a display zone have illumination adjusted to achieve power, thermal and/or OLED material preservation goals. As an example, a display zone that presents passive or background content is adjusted to generate visual images with a partial pixel density while a display zone with active content is presented with full pixel density. For instance, partial pixel density places at least some OLED pixels in the display zone in an off state to reduce power consumption and thermal energy generation without undue impact on visual image presentation while full pixel density presents visual images at a base commanded color and luminance. As another example, a pixel refresh rate is reduced in a display zone having a static or passive content to reduce power consumption and thermal energy release. In one embodiment, compensation values that adjust current applied to OLED material in pixels are validated by comparing a compensation image presented by the OLED display against a camera picture image captured of the display.

The present invention provides a number of important technical advantages. One example of an important technical advantage is that an OLED display adapts to present visual images at different display zones to achieve power, thermal and OLED material preservation objectives. By adjusting pixel density, refresh rate and other visual image presentation parameters in passive content display zones, power consumption, thermal energy release and OLED material degradation may be reduced. Graduated adjustments at passive content display zones provide adjustments that have minimal impact on the end user experience and in an imperceptible manner. Visual image compensation, which impacts power and thermal constraints as well as image ghosting, is updated by capturing a picture with an external camera of a defined compensation image to compare the base commanded visual image applied to the display with the actual illumination presented by the display so that compensation values adjust to present more accurate representations of based commanded visual images without ghosting effects.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An organic light emitting diode (OLED) display in a portable information handling system adapts power and thermal management to operating conditions with measured adjustments to OLED material degradation over time. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
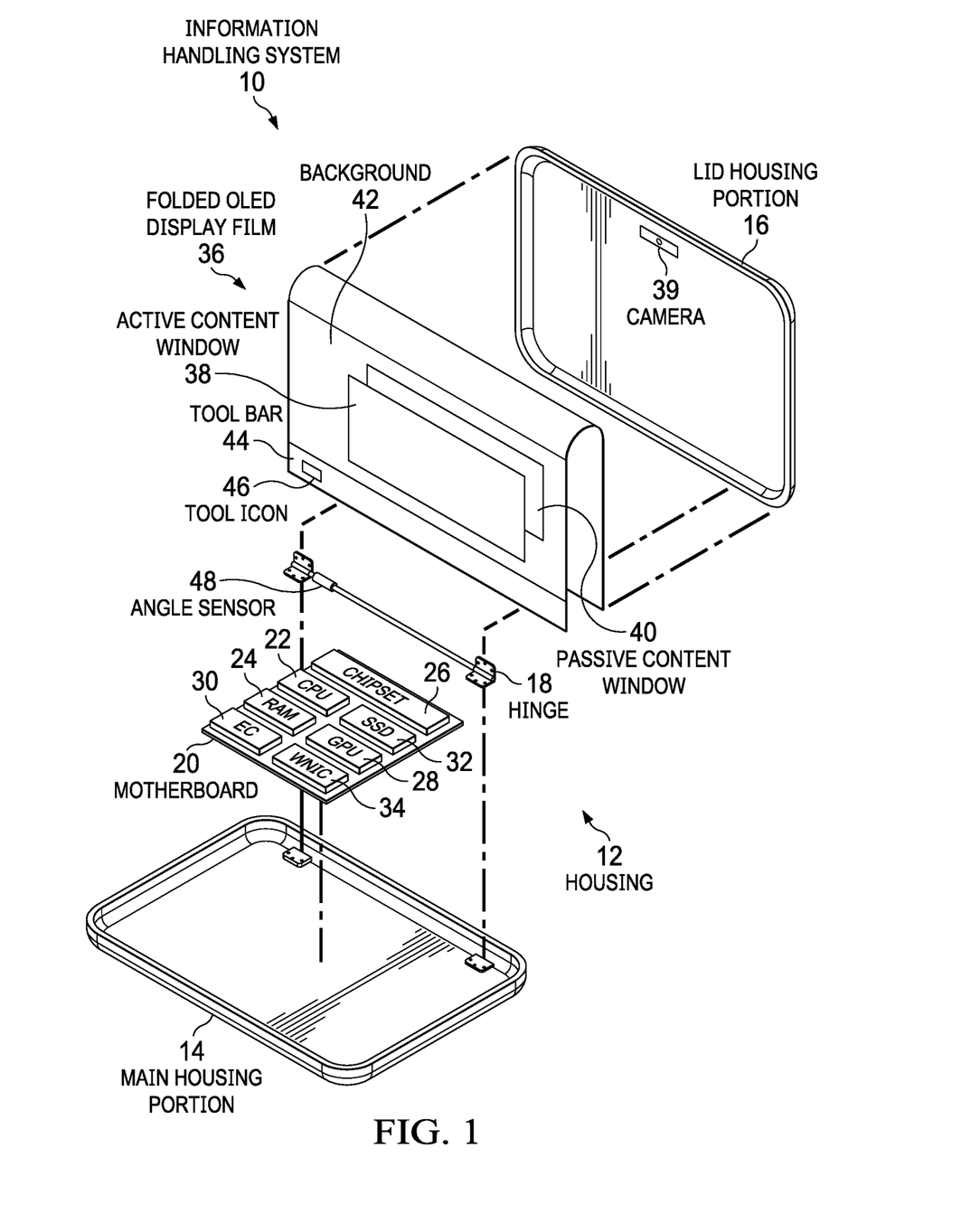
FIG. 1 depicts an exploded view of a convertible information handling system having a folded organic light emitting diode (OLED) display disposed over a housing portion to present visual images at opposing sides of the housing portion.

Referring now to FIG. 1, an exploded view of a convertible information handling system 10 depicts a folded organic light emitting diode (OLED) display 36 disposed over a housing portion 16 to present visual images at opposing sides of the housing portion. In the example embodiment, convertible information handling system 10 is built into a portable housing 12 having a main housing portion 14 and lid housing portion 16 rotationally coupled with a hinge 18. For instance, housing 12 rotates from a closed position having lid housing portion 16 proximate to main housing portion 14 to a clamshell position having lid housing portion 16 raised substantially perpendicular to main housing portion 14. In one embodiment, housing 12 rotates to a tent position having approximately 270 degrees of rotation and a tablet position having a full 360 degrees of rotation. At the varied rotational orientations, folded OLED display film 36 has different display surfaces exposed at different orientations relative to the end user and varied ambient conditions, such as external lighting and the external environment for thermal rejection. That is, as lid housing portion 16 raises away from main housing portion 14, greater surface exposure to external conditions improves thermal rejection for folded OLED display 36. In one alternative embodiment, a second folded OLED display film 36 may be disposed over main housing portion 14 to act as a display and input/output device, such as by presenting a virtual keyboard to accept key input values.

Information handling system 10 processes information with processing components disposed in main housing portion 14. The example embodiment depicts a motherboard 20 coupled to main housing portion 14 to support and interface the processing components, such as through wirelines of a printed circuit board. A central processing unit (CPU) 22 couples to motherboard 20 and interfaces with random access memory (RAM) 24 to execute instructions that process information, with the instructions and information stored in RAM 24. A chipset 26 interfaces with CPU 22 to manage CPU clock and communication functions. A graphics processor unit (GPU) 28 interfaces with CPU 22 to accept information for presentation at folded OLED display 36 and process the information into pixel values that define color and luminance of pixels of folded OLED display film 36, as is described in greater detail below. An embedded controller (EC) 30 manages operation of physical components on motherboard 20, such as for application of power and thermal transfer systems. A solid state drive (SSD) 32 stores information in non-transitory flash memory or other persistent storage to retain the information during periods of no power. For example, SSD 32 stores an operating system and applications that execute on CPU 22 to process information that generates visual images at folded OLED display film 36. A wireless network interface card (WNIC) 34 interfaces with CPU 22 to support network communications, such as wireless local area network (WLAN) communications like WiFi and wireless personal area network (WPAN) communications like Bluetooth. In some example embodiments, WNIC 34 may support wired communications as may a USB or similar cable port.

Folded OLED display film 36 interfaces with GPU 28 to accept pixel values for presentation as visual images. In the example embodiment, folded OLED display film 36 folds over top of lid housing portion 16 to expose a display surface on opposing sides of lid housing portion 16. A camera 39 is aligned to capture pictures of visual images facing the display surfaces, such as to support video conferencing. In various embodiments, folded OLED display film 36 presents various types of visual images, typically based upon end user selections and preferences. An active content window 38 presents information selected by the end user to interact with inputs made by the end user, such as through a keyboard or mouse. In alternative embodiments, the end user may select active content window 38 to expand for presentation of visual information across the entire display surface. In the example embodiment, a passive content window 40 presents other visual images that are not actively associated with end user inputs. In a typical use environment, passive content window 40 presents information of an application instance as a background under active content window 38 that an end user may select with a mouse click to bring the information into focus to accept inputs so that the end user can rapidly change between applications and/or application instances. A background visual image 42 presents a default image where other content is not selected, such as a screensaver, wallpaper or default color. A tool bar 44 with a variety of tool icons 46 are presented along the bottom edge of OLED display film 36, such as quick start icons for applications and operating system functions.

Figure 2:
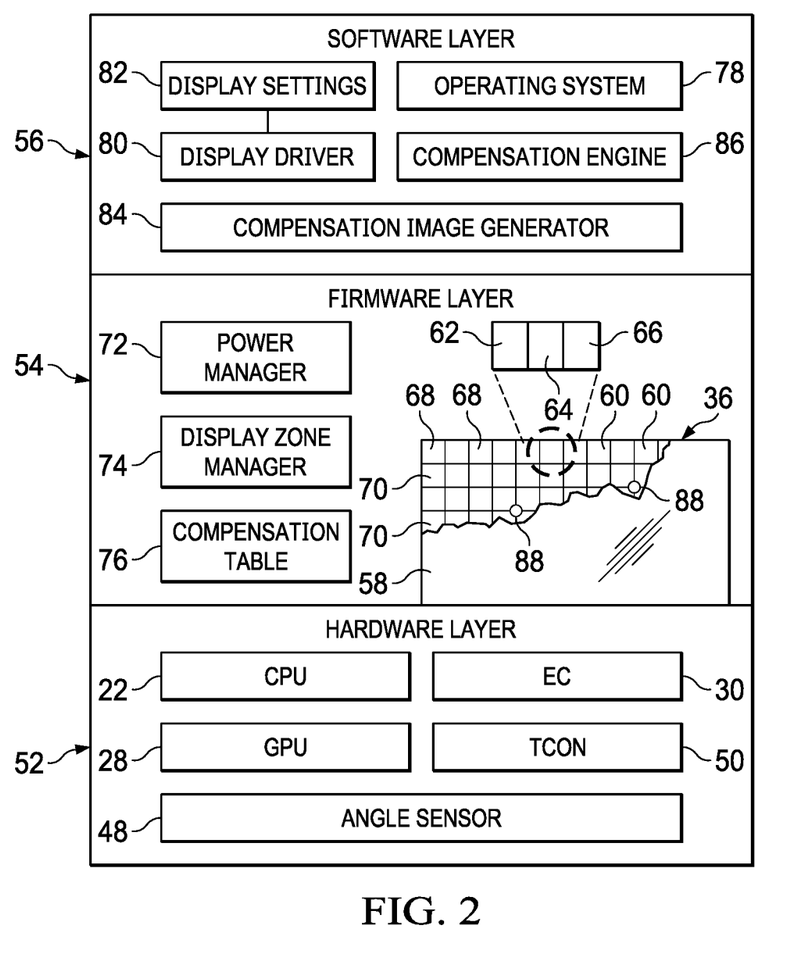
FIG. 2 depicts a block diagram of an information handling system configured to manage power and thermal constraints related to OLED display presentation of visual images.

Referring now to FIG. 2, a block diagram depicts an information handling system 10 configured to manage power and thermal constraints related to OLED display presentation of visual images. A hardware layer 52 includes hardware components that cooperate to process and present information as visual images. For example, CPU 22 executes instructions that create visual information, which GPU 28 further processes into pixel values that define a visual image. The pixel values are provided to a timing controller (TCON) 50, which scans the pixel values for application at OLED display 36. The example embodiment depicts OLED display 36 as having plural pixels 60 disposed under a cover glass 58 in an array of pixel columns 68 and pixel rows 70. Each pixel 60 includes red OLED material 62, blue OLED material 64 and green OLED material 66. TCON 50 scans pixel values across pixel columns 68 and along pixel rows 70 to apply current at each of red, blue and green materials so that a color of a commanded brightness results at each pixel. The scan of pixel values takes place at a refresh rate that creates a visual image so that an end user cannot detect changes over time. For instance, a scan refresh rate of approximately 60 Hz will typically support a moving visual image without an end user perceiving the changing pixels due to changes in pixel values, such as can show up in ghosts of moving images. Lower scan refresh rates of as low as 10 Hz may provide a satisfactory image quality where movement is minimal. Thermal sensors 88 are disposed within display 36 to monitor thermal conditions related to the presentation of visual images and report the thermal conditions to embedded controller 30. Since OLED material generates illumination through dissipation of power, thermal conditions may vary across display 36 depending upon the color and luminance generated at each pixel. An angle sensor 48 detects relative rotational orientation of housing portions of information handling system 10. Angle sensor 48 may be a Hall sensor or other physical device that monitors hinge position, or a set of accelerometers that measure orientation of the housing portions relative to gravity.

Information handling system 10 includes a firmware layer 54 having embedded code stored in non-transitory flash memory to execute on processing components of hardware layer 52. For example, firmware embedded code is installed and managed as drivers by an operating system 78 of a software layer 56. A power manager 72 executes on embedded controller 30 to monitor power use of hardware layer 52. For example, power manager 72 coordinates application of power available from a charger at variable levels demanded by CPU 22 based upon availability of battery charge and/or an external power source. A display zone manager 74 monitors operating conditions at information handling system 10 to define plural display zones of contiguous pixels 60 of display 36 for management of visual image presentation as is addressed in greater detail below. For instance, display zone manager 74 executes on CPU 22, GPU 28 and embedded controller 30 to define display zones based upon presented content, environmental conditions, housing position, power consumption and thermal conditions. A compensation table 76 stored in non-transitory memory includes compensation values for pixels 60 that adjust pixel values based upon degradation of OLED material over time. The compensation values are estimated based upon the response of the OLED material to current, such as with periodic calibration processes, and based upon tracking of images presented at display 36 and known degradation characteristics. For instance, blue OLED material tends to degrade more quickly than red and green OLED material. The compensation values may be applied by various hardware components, such as GPU 28 or TCON 50, so that pixels 60 have current applied to generate an intended color and brightness instead of a degraded color and brightness that would result from application of a base uncompensated pixel value.

Software layer 56 includes an operating system 78, such as WINDOWS, that provides logical interfaces for applications to access resources of firmware layer 54 and hardware layer 52. For example, operating system 78 includes a display driver 80 having embedded code distributed as firmware to interact with GPU 28 for control of operation of display 36. For example, display driver 80 accepts display settings 82, such as from a display control panel of operating system 78, and applies the display settings through GPU 28 for effect at display 36. For example, end user color, contrast and brightness display settings are applied by display driver 80 to determine a base value for pixels 60, such as what would be used by a liquid crystal display that does not experience pixel material degradation. Once GPU 28 determines the base pixel values, each pixel value is further compensated based upon compensation values of compensation table 76 to present the desired image with display 36 at its degraded pixel state. In addition to other applications, software layer 56 includes a compensation image generator 84 and a compensation engine 86. As is described in greater detail below, compensation image generator 84 creates a compensation image for presentation on display 36 that presents defined pixel values for a calibration process by compensation engine 86 to update compensation values of compensation table 76.

In operation, display zone manager 74 monitors power, thermal and other conditions at information handling system 10 to adjust visual images presented at display 36 to achieve desired presentation, power and thermal constraints. Display zone manager 74 divides display 36 into plural display zones that each have plural contiguous pixels based upon conditions detected at display 36. As one example, display zones may be defined to include pixels that present active content as one display zone, passive content as another zone, background as another display zone and a tool bar as another display zone. In another example embodiment, display zone manager 74 defines display zones based upon rotational orientation of housing portions and the relative position of display 36 to an anticipated position of an end user. For instance, a display portion folded on a housing portion that is rotated to have one surface towards an end user and the other hidden may be divided into first and second zones based on orientation with additional zones defined based on content as described above. In one alternative embodiment, display zone manager 74 defines zones based upon thermal conditions detected by thermal sensors 88, such as by identifying portions of display 36 that have nonuniform temperature distributions. In another alternative embodiment, display zones may be defined based upon degradation and associated compensation values, such as to provide degradation leveling on a zone basis while achieving thermal and/or power management constraints. In various alternative embodiments, different types of display zones of varying size and dimensions may be defined to achieve desired control so that pixels 60 in each defined display zone are individually managed to achieve the desired control.

Once display zone manager 74 defines display zones to achieve a desired objective, adjustments defined by display zone manager 74 are applied at each pixels of each display zone by GPU 28, such as with alterations to compensation table 76 that include the adjustments. Pixels in an active display zone present visual images at a full density, meaning that the pixels all illuminate at a base compensated value that generates a visual image as commanded from the operating system and corrected by the compensation values of compensation table 76. Pixels in non-active display zones present visual images with a partial pixel density, meaning that some of the pixels, such as half, illuminate at the based compensated pixel value while the rest of the pixels apply an adjusted pixel value, such as an off state, a reduced brightness state or a reduced refresh rate state. In one example embodiment, power management is achieved by reducing power drawn by pixels 60 in display zones having less demanding display constraints. For instance, in a display zone associated with a passive content or background, power is reduced by placing at least some of the pixels 60 into an off state having no current applied. Alternatively, some of the pixels may have a reduced brightness that uses less current or a reduced refresh rate, which also decreases power consumption. In an Ultra High Definition (UHD) display having 4,000 (4K) pixels, applying an off state, reduced brightness or reduced refresh rate at every other pixel along a scan will decrease power consumption with minimal impact on the presentation of visual images. For example, an active content display zone may present visual images with all pixels at the base compensated pixel values while a background display zone presents a background visual image with every other pixel illuminated so that the overall presentation of visual images has a minimal and even imperceptible impact on the end user experience. Within the display zone, the pixels 60 selected for the off state may alternate so that degradation across the display zone pixels has an even impact over time. In some embodiments, the partial pixel density may include more than half or less than half of the pixels in the display zone.

Another example of an objective associated with defined display zones is a thermal objective. As OLED material dissipates power to generate illumination, excess thermal energy created with the illumination results in an increase to the skin temperature of information handling system 10, which generally must be rejected to the external environment to avoid excessive skin temperatures. Within an OLED display film, the thermal energy generated at different pixels may vary substantially depending upon the color and brightness of each pixel. Display zone manager interfaces with thermal sensors 88 to detect thermal conditions and adjust power applied in display zones to achieve a desired thermal constraint, such as a uniform thermal distribution across the display. For instance, if a housing orientation places a display portion out of end user view as determined by angle sensor 48, a change to the refresh rate in the hidden display zone can increase or decrease thermal energy released by the pixels of the display zone. Since the current applied at a pixel, and thus the thermal energy released, varies depending upon compensation applied to the pixel from the compensation table, the compensated value is used to determine thermal management. As an example, a convertible information handling system having a folded OLED display disposed on opposing sides of a housing portion may apply visual images on a hidden display zone that improves the uniformity of thermal distribution as an adjustment to thermal release at an active display zone on the opposing side of the housing portion.

In various embodiments, partial pixel densities in a display zone may be applied in various ways that help to minimize the impact on an end user experience and improve the life of OLED material. As one example, blue pixel illumination is reduced in a passive or background content display zone by gradually transitioning blue out of the pixels to increase the presentation of green illumination. For instance, a timer is referenced while the pixel values are gradually changed to remove blue OLED material illumination and, in one example embodiment, replace blue illumination with green illumination. For example, a color shift of approximately 2% is applied gradually in a manner that the end user would have difficulty perceiving. When the shift from blue to green illumination is applied in a passive display zone, the end user impact is negligible and may instead help to emphasize the active display zone, which continues to present base compensated pixel values. As an alternative, blue illumination may take place at a lower refresh rate, which applies less wear on the blue OLED material. In another example embodiment, a display zone may have overall brightness diminished gradually over time, such as by reference to a timer that gradually decreases illumination at a rate not perceptible to an end user. In one embodiment, the gradual change in brightness, color or refresh rate may be supported in part with eye tracking or other sensors that determine end user focus on content display zones and passive display zones.

Compensation image generator 84 and compensation engine 86 cooperate to provide a measured update to compensation table 76 that provides more accurate and meaningful thermal and power management. Compensation values of compensation table 76 are applied to adjust current applied to pixels based upon degradation of OLED material, and the applied current relates not only to the illumination that is created but also to the power consumed and thermal energy released by the illumination. To provide a measurement of actual compensation needed at display 36 to achieve a uniform visual image presentation, compensation image generator 84 creates a visual image for presentation at display 36 with defined compensation values. An external camera captures a picture visual image of the compensation image at display 36 and provides the capture picture to compensation engine 86 for a comparison of the displayed pixel illumination against the expected illumination of the compensation image so that a measured compensation can be determined. For example, a camera 39 integrated within an external information handling system, such as portable telephone, captures the picture of the compensation image and communicates the picture to the compensation engine. Alternatively, the external information handling system that captures the compensation engine may retrieve the compensation image to it to perform compensation analysis and return compensation values to the information handling system that presented the compensation image. Compensation image generator 84 may command a uniform full power pixel illumination and measure compensation based upon actual illumination difference to the full power illumination. Alternatively, compensation image generator 84 may present a compensation image having compensation values of compensation table 76 applied so that an error that exists in the compensation values will show as a nonuniform visual image.

In one example embodiment, compensation engines 86 operating on information handling system 10 and an external camera system coordinate to aid in the accuracy of the compensation value measurement. For instance, a difference between a presented image pixel and a picture image pixel is used to determine the difference between what GPU 28 commands for illumination at display 36 and what illumination is actually produced. A typical external camera captures 10 or more megapixels in a visual image so that each pixel 60 of a compensation engine can be analyzed across multiple pixels of the picture captured of display 36; however, when pixels in proximity to each other both illuminate, light may bleed between the pixels so that the accuracy of analysis of the compensation image. To help isolate pixels 60 during presentation of a compensation image, compensation image generators 84 at the presenting and capturing systems may synchronize changes to the compensation image over time with time stamps to aid analysis with capture images. For instance, the compensation image may include a video having alternating pixels in an off state and transitioning at time stamps to an on state while illuminating pixels transition to an off state. As an alternative, each pixel color may illuminate separately with alternating red, green and blue pixels so that each pixel's material for each color is separately measured and the different colors help to separate illuminated pixels for analysis. In one embodiment, a wireless communication between the systems provides a live feed of captured pictures to the compensation engine so that a real time command of changes to compensation image generator may adjust the compensation image as satisfactory visual images for comparison are captured.

Figure 3:
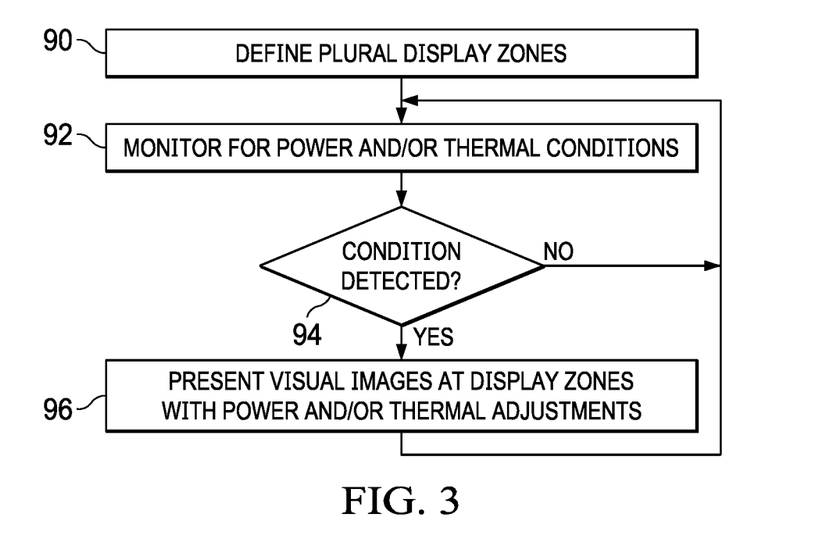
FIG. 3 depicts a flow diagram of a process for adjusting visual image presentation to achieve power and thermal management objectives.

Referring now to FIG. 3, a flow diagram depicts a process for adjusting visual image presentation to achieve power and thermal management objectives. The process starts at step 90 with definition of plural display zones at the display. As described above, the display zones may be defined to achieve various objectives based on system configuration and content presentation. At step 92, monitoring is performed for power and thermal conditions that are subject to management by adjustments is display presentation of visual images. For instance, a low battery charge might initiate a power saving constraint. Similarly, a skin temperature nonuniform condition may initiate a thermal management constraint. At step 94, a determination is made of whether a thermal or power condition is detected that is associated with an adjustment to visual image presentation at the display. If not, the process returns to step 92 to continue monitoring for power and thermal conditions. If a thermal or power condition is detected, the process continues to step 96 to present visual images at the display zones with power and/or thermal adjustments, such as are described above or in greater detail below.

Figure 4:
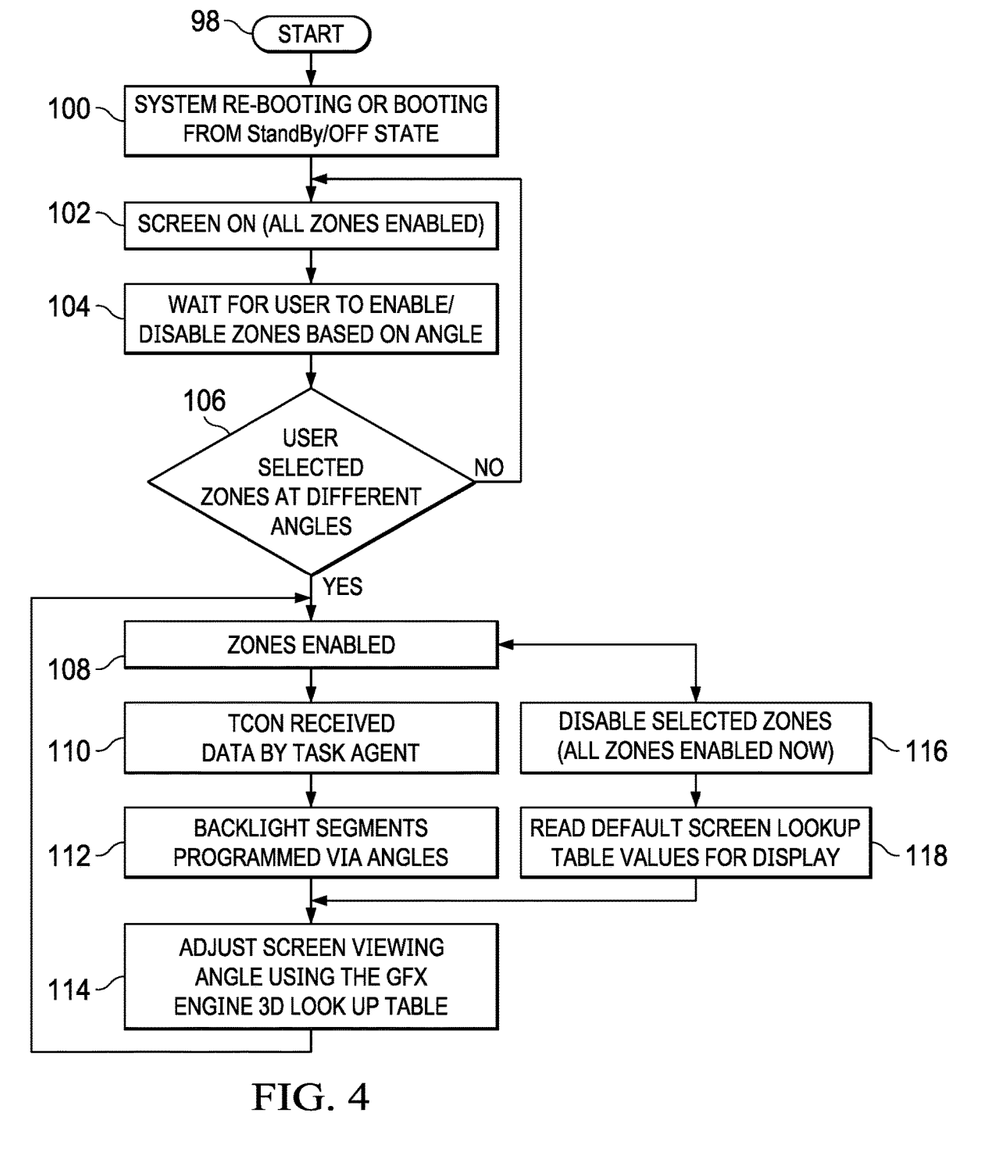
FIG. 4 depicts a flow diagram of a control process for adjusting power applied for presentation of visual images based upon housing rotational orientations.

Referring now to FIG. 4, a flow diagram depicts a control process for adjusting power applied for presentation of visual images based upon housing rotational orientations. The process starts at step 98 and initiates at step 100 with transition of the information handling system from an off state or standby state having the display idle. At step 102, the display screen transitions to an on state to present visual information with all display zones enabled. At step 104, the process waits for end user selection of display zone management based upon housing rotational orientation. In one example embodiment, display zones enable automatically based upon detected housing rotational orientation angles, although alternative embodiments may use other conditions to initiate display zones, such as power or thermal states. Alternatively, display zones may remain inactive until selected by an end user. At step 106, a determination is made of whether display zones are enabled and, if so, the process continues to step 108. If display zones are not enabled, the process returns to step 102 to continue monitoring conditions.

At step 108, display zones are enabled. In one embodiment, display zones are predefined, such as by grouping predetermined contiguous pixels based upon detected rotational orientation. In an alternative embodiment, display zone boundaries are defined as display zones are enabled and updated as conditions change, such as power and thermal conditions. For instance, display zones seeking to manage power consumption might change boundaries as selected content changes; and display zones seeking to manage thermal conditions might change boundaries as thermal uniformity across the housing skin changes. At step 110, the timing controller is provided with the display zones by the display driver through the graphics processor, and at step 112 the variations in illumination for each display zone are applied based upon the detected housing rotational orientation. At step 114, the display screen presentation of visual images is adjusted in each display zone based upon viewing angle by using the graphics processing unit three dimensional look up table of display compensation values. As described above, various embodiments may enforce different display zone logic to achieve different display objectives. In some embodiments, the timing controller and graphics processing unit cooperate to apply adjusted pixel values in an efficient manner that avoids disruption of presented visual images. The process then returns to step 108 to continue monitoring the display zone configuration.

At step 108, if the process detects a condition or command to cease the use of display zones, the process continues to step 116 to disable the selected display zones. At step 118, the process retrieves the default display screen lookup table values and applies those values to the display visual image. The process then continues to step 114 to adjust display operations based upon rotational orientation and the default display settings. In alternative embodiments, adjustment of the display to default settings may impact other power and thermal management processes. For instance, transition to default display logic may increase power draw and display zones having partial pixel density return to full pixel density that has increased power consumption and thermal release.

Figure 5:
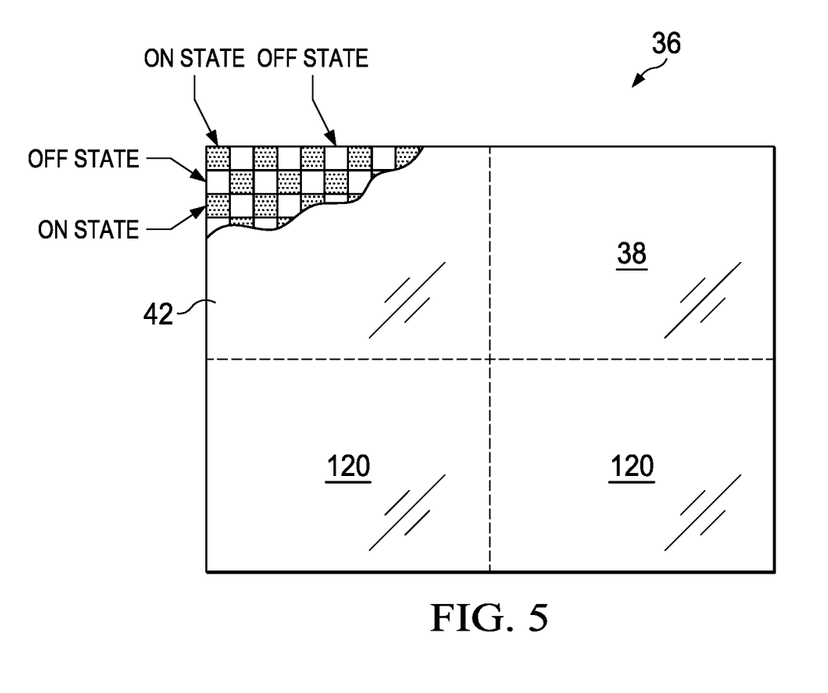
FIG. 5 depicts an example of an OLED display with display zones having content and power management configurations.

Referring now to FIG. 5, an example of an OLED display 36 depicts display zones 120 having content window 38 and power management configurations. In the display zone 120 having content window 38, visual images are presented with the base compensated pixel values provided from the graphics processor. That is, content window 38 is presented with visual qualities selected by the end user through display settings and adjusted by compensation values to correct for OLED material degradation. The base compensated visual images present content window 38 with visual characteristics intended by the end user. In the example embodiment, power management is provided at a display zone 120 presenting background 42 visual images. The background 42 visual image has a partial display density with every other pixel placed in an off state to reduce power consumption without excessive impact on visual quality. In one example embodiment, the off state is enforced by the timing controller by cutting off current to the off state pixels. Periodically, the timing controller shifts the on pixels to an off state and the off pixels to an on state to encourage level degradation of the OLED material. In alternative embodiments, other types of adjustments may be applied, such as using decreased pixel brightness instead of an off state or scanning a refresh at only the pixels in the on state. In an alternative embodiment that addresses thermal management, pixels may be selected for the on state and off state based upon thermal conditions at the information handling system where the off state will reduce thermal release by display 36 and the on state will increase thermal release.

Figure 6:
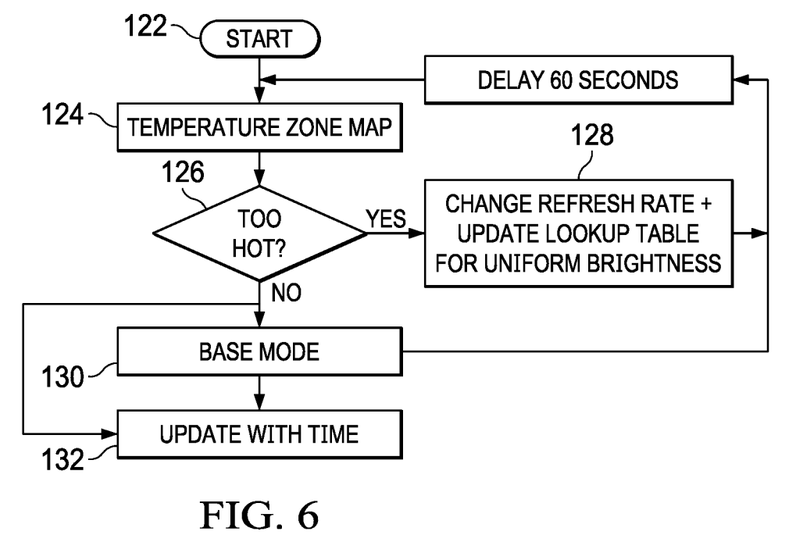
FIG. 6 depicts a flow diagram of a process for managing information handling system skin temperature by adjusting display zone pixel illumination.

Referring now to FIG. 6, a flow diagram depicts a process for managing information handling system skin temperature by adjusting display zone pixel illumination. The process starts at step 122 and continues to step 124 to retrieve a temperature zone map of the information handling system housing skin temperatures, such as based upon temperatures sensed by thermal sensors disposed around the housing. At step 126, a determination is made of whether any portions of the temperature zone map are too hot. The thermal constraint may be an absolute maximum temperature or may be a nonuniform temperature condition having too large of a thermal gradient across the display. For instance, disparate temperature distributions can impact the quality of illumination presented across a visual image as OLED material responds differently at different temperatures. If the thermal constraints are not exceeded, the process continues to step 130 to operate the display in a base mode, step 132 to update the time, and then to step 124 after a predetermined delay, such as 60 seconds. If at step 126 the temperature is too high, the process continues to step 128 to adjust the display refresh rate and update the lookup table for compensation that will provide a uniform brightness at the detected thermal conditions and refresh rate. In various embodiments, refresh rate may be adjusted across the entire display or in an individualized manner in separate display zones to target a desired thermal state. The process returns to step 124 after a 60 second delay to continue monitoring the thermal state until the base. In alternative embodiments, alternative illumination of display pixels may be applied to manage thermal conditions. For example, a partial pixel density may be used that changes the ratio of pixels on versus off so that a thermal state of the display is achieved.

Figure 7:
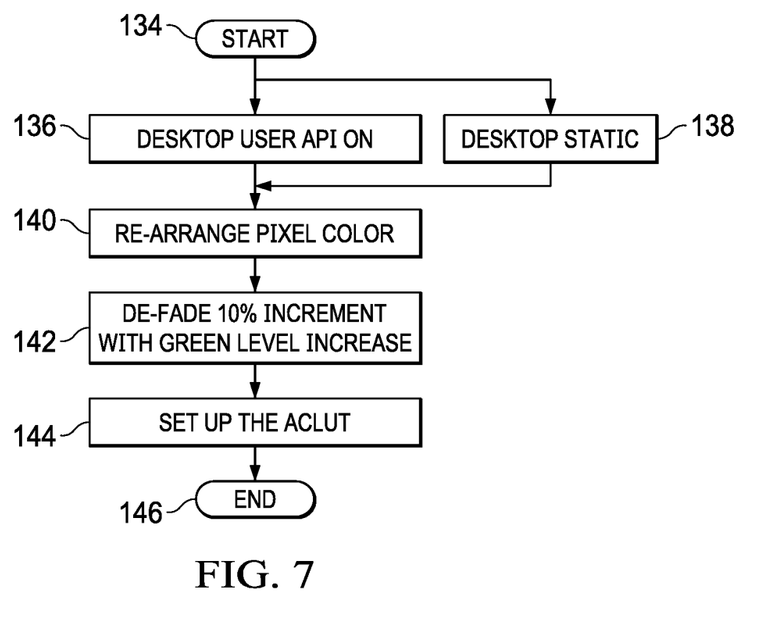
FIG. 7 depicts a flow diagram of a process for managing presentation of ghost images at an OLED display by adjusting color presented at the display.

Referring now to FIG. 7 a flow diagram depicts a process for managing presentation of ghost images at an OLED display by adjusting color presented at the display. In particular, some parts of the display, such as the tool bar, tend to show the same image for an extended time period, such as a trash or quick start icons, so that OLED material degradation can cause the image to ghost on the display even when not selected. To minimize the impact of static images, a timer and estimate of end user activity level applied to gradually transition from a base or commanded color to an off color that offsets the ghosting. The process starts at step 134 and determines if a desktop user application programming interface (API) is active at step 136 or a static desktop is presented at step 138. If so, the process continues to step 140 to rearrange pixel coloration. Generally, blue OLED material tends to degrade at a more rapid rate than other colors so that pixel coloration will typically bias away from blue and towards red or green, although pixel color may bias towards blue in some instances. At step 142, the selected color is faded in small increments that make the changes in appearance to the visual images imperceptible to an end user, such as increments of 10% or even 2%. At step 144 the look up table referenced by the graphics processor and/or timing controller is set to maintain the selected color and the process ends at step 146. In the example embodiment, color fade may be managed over a display as a whole, a display zone or a particular image, such as an icon.

Figure 8:
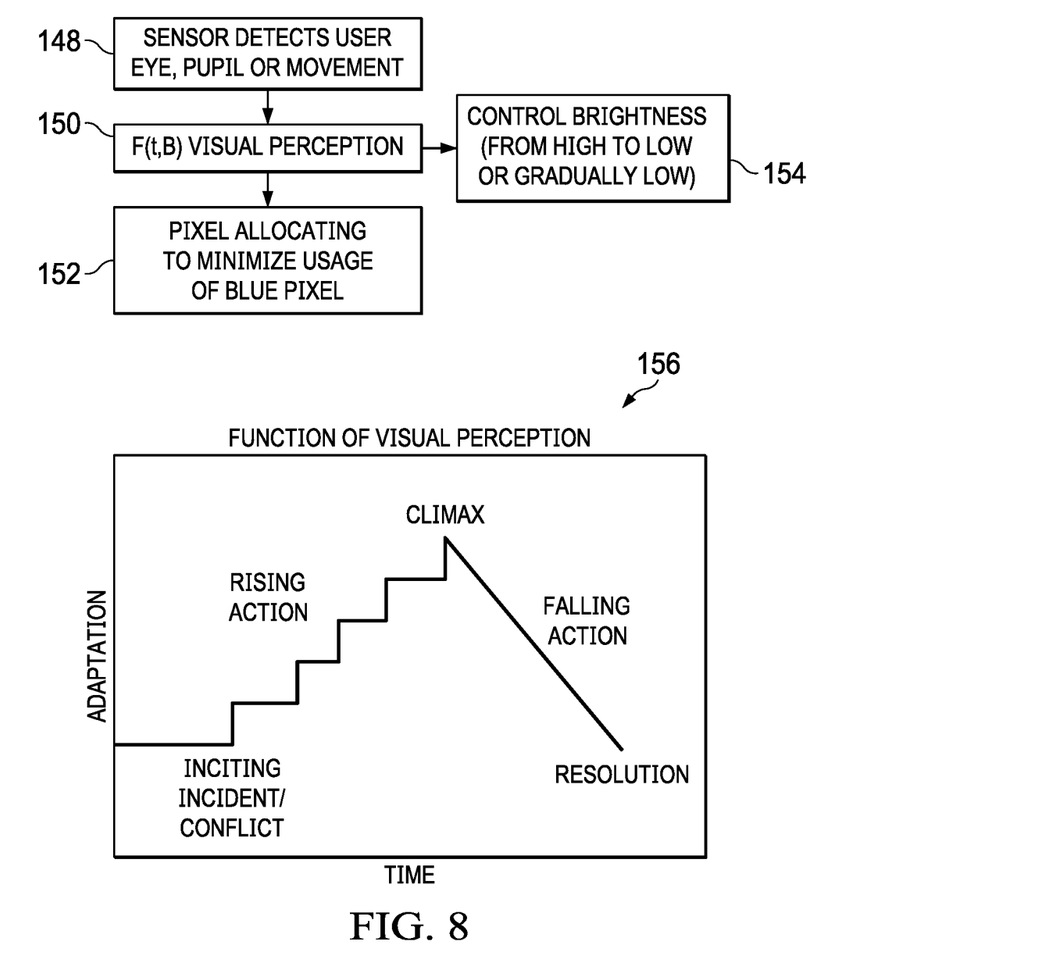
FIG. 8 depicts a flow diagram of a process for adjusting thermal and or power constraints associated with an OLED display by adjusting perceived brightness at the display.

Referring now to FIG. 8, a flow diagram depicts a process for adjusting thermal and or power constraints associated with an OLED display by adjusting perceived brightness at the display. The process seeks to enforce adjustments to presentation of visual images for thermal, power and other considerations in a manner imperceptible to an end user. Based upon an end user's interactions, such as end user proximity, gaze and inputs at I/O devices, display refresh rates, contrast settings and brightness are adjusted gradually over time. Although contrast is typically defined as white and black levels in a display visual image, however, blue, red and green color mixtures also give high contrast. Selectively allocating these colors at OLED pixels will adapt contrast while offering reducing blue OLED material degradation and decreasing power consumption. Based upon end user position and selected content, as the user defocuses a low refresh rate change to a high refresh rate adapts the visual image to the contrast change. The process starts at step 148 with sensor detection of the end user eye and/or pupil movement to indicate the portion of the display in focus. At step 150, visual perception of an end user to changes in visual image presentation are determined as a function of time and image brightness. Applying the time and brightness function, at step 152, pixel color allocation is adjusted to minimize usage of blue pixels gradually over time while the image remains static. At step 154, brightness is controlled from a high value to a lower value gradually over time in a manner imperceptible to the end user. In the example graph 156, the changes to color and brightness implemented gradually over time are depicted for an example embodiment that performs changes in brightness and color contrast in increments over time. Generally, adjustments to display visual image presentation as described above with respect to power and thermal management may also be performed in this graduated manner for display zones.

Although the present invention has been described in detail, it should be understood that various changes, substitutions and alterations can be made hereto without departing from the spirit and scope of the invention as defined by the appended claims.

What is claimed is:

1. A system for managing thermal conditions associated with an organic light emitting display (OLED), the system comprising:
 a non-transitory memory operable to store instructions; and
 instructions stored in the non-transitory memory that when executed on a processor are operable to:
 detect a thermal state of an OLED display including at least a temperature of the OLED display;
 present visual images at a first zone of the OLED display with a full pixel refresh rate; and
 present visual images at a second zone of the OLED display with a partial pixel refresh rate set to achieve an adjustment of the thermal state, including at least reducing the temperature of a portion of the second zone of the OLED display, the partial pixel refresh rate having at least some of the pixels of the second zone at a full refresh rate and at least some of the pixels of the second at less than the full refresh rate.

2. The system of claim 1 wherein the instructions are further operable to:
 retrieve degradation information associated with the plural pixels of the second zone; and
 apply the degradation information to provide the adjustment of the thermal state.

3. The system of claim 1 wherein the instructions are further operable to:
 present visual images in the first zone with a full pixel density; and
 present visual images in the second zone with a partial pixel density.

4. The system of claim 3 wherein the partial pixel density comprises a dynamically adjusted ratio of pixels in an on state and an off state based upon the thermal state.

5. The system of claim 1 wherein the partial pixel refresh of the second zone has every other pixel at a full refresh rate.

6. The system of claim 5 where in the instructions further alternate pixel assignments in the second zone between the full refresh rate and the less than full refresh rate over time to balance pixel degradation.

7. The system of claim 5 wherein the less than the full refresh rate comprises off.

* * * * *